(12) United States Patent
Schütte et al.

(10) Patent No.: US 6,208,915 B1
(45) Date of Patent: Mar. 27, 2001

(54) METHOD FOR LOW-FUEL, COMPUTER-ASSISTED CONTROL OF ANY NUMBER OF THRUSTERS ARRANGED ON A SPACECRAFT

(75) Inventors: Andreas Schütte; Kolja Auf der Heide, both of Berlin (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/403,552

(22) PCT Filed: Mar. 19, 1998

(86) PCT No.: PCT/EP98/01595

§ 371 Date: Jan. 6, 2000

§ 102(e) Date: Jan. 6, 2000

(87) PCT Pub. No.: WO98/49058

PCT Pub. Date: Nov. 5, 1998

(30) Foreign Application Priority Data

Apr. 25, 1997  (DE) .............................................. 197 18 922

(51) Int. Cl.[7] .................. B64G 1/24; B64G 1/26
(52) U.S. Cl. ..................... 701/13; 244/164; 244/169; 244/171; 244/172; 244/158 R; 701/3; 701/4; 701/226
(58) Field of Search ................... 701/13, 4, 226, 701/3; 244/164, 171, 158 R, 172, 169, 165

(56) References Cited

U.S. PATENT DOCUMENTS

| | | | |
|---|---|---|---|
| 5,130,931 | 7/1992 | Paluszek et al. | 701/226 |
| 5,140,525 * | 8/1992 | Shankar et al. | 364/459 |
| 5,335,179 * | 8/1994 | Boka et al. | 364/434 |
| 5,646,847 * | 7/1997 | Ratan et al. | 364/424.013 |

FOREIGN PATENT DOCUMENTS 195 19 732A1  12/1996  (DE) .

OTHER PUBLICATIONS

Wiktor, Peter J., Minimum Control Authority Plot: A Tool for Designing Thruster Systems, Journal of Guidance, Control, and Dynamics, vol. 17, No. 5, Sep.–Oct. 1994.

Noble, Ben et al., Applied Linear Algebra, Prentice-Hall, Englewood Cliffs, NJ, 1988, 3$^{rd}$ edition, pp. 338–350.

Suzuki, Takashi et al. An Application of Fuzzy Algorithm to Thruster Control System of Spacecraft, 19$^{th}$ Int'l Symposium of Space Technology and Science (ISTS) Publication 94–c–16, Yokahama, Japan, 1994.

Vladimirov, V.P. et al., Correction Problem with a Constraint on the Number of Impulses, translated from Kosmicheskie Issledovaniya, vol. 18, No. 2, pp. 163–172, Mar.–Apr. 1980.

XP–002070357 Lineare Optimierung, pp. 695–717.

* cited by examiner

Primary Examiner—William A. Cuchlinski, Jr.
Assistant Examiner—Tuan C To
(74) Attorney, Agent, or Firm—Venable; Norman N. Kunitz

(57) ABSTRACT

A method for the on the whole minimum-fuel, computer-assisted control of an optionally determined number of thrusters, arranged as desired on a spacecraft, is to be specified, which method solves this linear optimization problem within the shortest possible time by reducing the computation expenditure. The method depends on the dual simplex algorithm and a suitably provided dual permissible start table. The dual permissible start table is set up on the basis of a previously computed optimum table and the transformation of the actual forces-moments vector belonging to the selected start table. Specific processing steps in the dual simplex algorithm are either not needed at all or are substituted with processing steps that require considerably less computation expenditure. Finally, a reduced table is used in place of the simplex table. This reduced table consists only of an identification number for a thruster, selected from the total number of thrusters, and the vector for the control values of the thrusters contained in this thruster selection. The reduction in computation expenditure is achieved in that specific processing steps are performed ahead of time and the corresponding results are then available in the form of data fields and indices or identification number matrixes in the working memory of the computer. In order to compute the thruster actuation, it is then only necessary to address and request these results of the initialization part of the method.

12 Claims, No Drawings

METHOD FOR LOW-FUEL, COMPUTER-ASSISTED CONTROL OF ANY NUMBER OF THRUSTERS ARRANGED ON A SPACECRAFT

BACKGROUND OF THE INVENTION

The invention relates to a method for an on the whole minimum-fuel, computer-assisted control of an optionally determined number of thrusters, arranged as desired on a spacecraft, wherein the thrusters can be controlled discretely or continuously.

The use of thrusters is necessary in many situations for exerting external forces and moments on a spacecraft. Since the use of the thrusters requires fuel and this fuel directly influences the starting weight and the service life of the spacecraft, in particular satellites, a thruster control with low total fuel consumption is extremely important. Thruster arrangements, which in principle permit a low fuel consumption, have a higher or equal redundancy with a lower number of thrusters and/or are influenced by the payload on the spacecraft, are frequently irregular and oblique-angled thruster arrangements. For those reasons, the requirement for a minimum-fuel thruster control, particularly also for optional (oblique-angled) fixed thruster arrangements on the spacecraft is particularly relevant.

It is known that the problem of minimum-fuel thruster control can be traced back to a linear optimization problem, for which the simplex algorithm represents a suitable and efficient solution method (e.g., see P. J. Wiktor "Minimum Control Authority Plot: A Tool for Designing Thruster Systems" in: Journal of Guidance, Control, and Dynamics, Vol. 17, No. 5, September–October 1994, pp. 4–5). The use of the simplex algorithm, however, frequently fails because of the required computation time. Thus, the real-time requirements for using the simplex algorithm within the control cycle of the steering and positioning control circuit of a spacecraft, for example, frequently cannot be met because computers that can be used in particular in high orbits cannot process the simplex algorithm with sufficient speed.

Many of the spacecraft (satellites) presently in use are provided with a thruster arrangement where each thruster is arranged parallel to one axis of the body coordinate systems of the spacecraft and thus orthogonal to the other two axes. As a result of this orthogonal and axis-parallel arrangement, each thruster can generate forces only in one axis direction and moments only in one rotational direction around the two other axes. The advantage of this arrangement is that each degree of freedom of the spacecraft as a rigid body can be controlled by using respectively two thrusters only, without influencing other degrees of freedom. Controlling the thrusters with this type of thruster arrangement is very easy. The disadvantage of this thruster arrangement is that at least twelve thrusters are required for the simultaneous and optional control of all degrees of freedom. If the failure of two optional thrusters must be tolerable, then 36 thrusters are required.

In contrast, a suitable oblique-angled thruster arrangement, meaning one that is not orthogonal and axis-parallel, essentially has the following three-point advantage:
1. Less than 12 thrusters are needed for a freely selectable fixed thruster arrangement.
2. Considerably fewer than 36 thrusters are needed for tolerating the failure of two optional thrusters.
3. A lower fuel consumption is possible for a minimum-fuel control of the thrusters.

The disadvantage of this thruster arrangement is that the minimum-fuel thruster control requires solving a linear optimization problem and that the computational expenditure for solving this problem with the simplex algorithm frequently is too high. Other methods have therefore been developed, which require less computation time and which make it possible to achieve a more or less minimum-fuel, but on the whole not completely low fuel, thruster control.

With the so-called "linear programming," the thruster control problem is viewed as a linear optimization problem and is solved with relevant methods for the linear optimization, e.g., the simplex algorithm. The previously mentioned disadvantage is the excessively high computation expenditure, which makes it impossible to use this method in many cases.

With the "table look-up method," all minimum-fuel thruster arrangements are computed for the unit forces and the unit moments with respect to one axis of the body coordinate system of the spacecraft (solving of the linear optimization problem) and are stored in a table. In the event that forces and moments must be exerted simultaneously during the operation, the corresponding thruster controls with respect to force or moment are read out of the table for each required axis and the required direction or rotational direction, and are multiplied with the corresponding value for the force component or the moment component in said direction. The control value for each thruster is obtained by adding the individual values for the respective thruster. This method is very simple and quick, but generally does not result in minimum-fuel thruster controls.

The improved and expanded "table look-up" methods are methods for setting up a look-up table containing entries for additionally introduced axes. These methods make it possible to determine fuel-saving thruster controls. At the same time, however, the functional clarity of the method decreases and the computation expenditure increases considerably because of the increasing size of the tables.

Other methods are based on the evaluating and improving the results determined with the "table look-up method." The goal of this evaluation consists in preventing or suitably correcting thruster controls with particularly high fuel consumption. The example to be mentioned in this connection is based on a fuzzy approach (compare T. Suzuki, K. Yasuda, S. Yoshikawa, K. Yamada, N. Yoshida "An Application of Fuzzy Algorithm to Thruster Control Systems of Spacecraft" in: ISTS 94-c-16, $19^{th}$ International Symposium on Space Technology and Science, Yokohama, Japan, May 15–24, 1994, pp. 1–8).

The goal of minimizing the fuel consumption on the whole is to determine a thruster control, which
1. exerts the required forces and moments on the spacecraft,
2. delivers a non-negative control value for each thruster, and
3. minimizes the sum of all control values for the thrusters.

As previously mentioned, this represents a linear optimization problem. Since solving the problem as a rule is too time-consuming, the quadratic optimization problem can be solved as a substitution problem.

The solution of the substitution problem leads to a determination of that thruster control, which
1. exerts the required forces and moments on the spacecraft,
2. delivers a non-negative control value for each thruster, and
3. minimizes the sum of all quadratic control values for the thrusters.

This quadratic optimization problem can be solved by providing the Moore-Penrose-inverted system matrix for the thruster arrangement on the spacecraft and an offset vector, which is computed with the aid of the singular value factoring (e.g. compare B. Noble, I. W. Daniel "Applied linear algebra" Prentice Hall International, INC. (1988), pp. 338–350). The solution for the quadratic optimization problem is then obtained as product of the Moor-Penrose inverted system matrix with the commanded forces-moments vector and the addition of the offset vector. Adding the offset vector means that only non-negative control values occur in the solution vector. However, computing the offset vector becomes numerically more and more involved if the number of thrusters to be controlled exceeds the dimension of the commanded forces-moments vector by two or more. The solution is generally not a minimum-fuel solution, but coincides with the solution for the linear optimization problem if the number of thrusters to be controlled exceeds the dimension of the commanded forces-moments vector by only one (e.g., compare DE 195 19 732 A1). A further disadvantage is that longer operating times are "penalized" disproportionally and therefore occur less often in the controls. However, it is better for the operation of the thrusters and their degree of effectiveness if they are operated for longer periods of time.

Existing methods therefore have the disadvantage that they either do not solve the linear optimization problem and thus generally do not provide the minimum-fuel control of the thrusters, or that the computation effort required for solving the linear optimization problem of the control methods is generally too high if the simplex algorithm is used.

It is the object of the invention to provide a method of the aforementioned type, with which the linear optimization problem for the minimum-fuel control of optionally fixed thruster arrangements, for a simultaneous realization of forces and moments on a spacecraft, can be solved in a significantly shorter time period than has been possible so far.

SUMMARY OF THE INVENTION

The above object is solved according to the invention by a method for the on the whole minimum-fuel, computer-assisted control of an optionally determined number of thrusters, arranged as desired on a spacecraft, wherein: a minimum-fuel control vector ($k_{opt}$) with exclusively non-negative control values for all specified thrusters is formed with the aid of the dual simplex algorithm; for this, a thruster selection identification number (I) is assigned to each thruster selection from the total number of thrusters on the spacecraft, which represents the optimum thruster selection for the minimum-fuel realization of an optional command vector ($b_{com}$); for the determination of the optimum control, the command vector (($b_{com}$), which includes the force and/or moment components to be exerted, is initially transformed to a start vector ($b=b_{start}$) through multiplication with a transformation matrix (($B_{start})^{-1}$); subsequently the dual simplex algorithm is executed until the vector for the control values (b) contains only non-negative control values or until the non-existence of a solution has been indicated; in the process, the dual simplex algorithm is realized in that all data necessary for processing the dual simplex algorithm, which can be computed off-line (ahead of time), are first determined, are stored in data fields in the computer memory and are called up with suitable addresses from the computer memory to be used for computing with the simplex algorithm during the on-line operation, wherein only a reduced simplex table, in which only the thruster selection identification number and the associated vector for the control values (b) are listed, is used.

Thus, the method according to the invention is advantageously based on a method that is similar to the simplex algorithm, but which leads to a shortening of the computation time of approximately one order of magnitude, owing to the consequent use of the characteristic features for the thruster control in spacecraft and by not using the standard simplex table or tableau.

Advantageous embodiments and modifications of the basic method according to the invention are disclosed and claimed.

DETAILED DESCRIPTION OF THE PREFERRED EMBODIMENTS

The method according to the invention is based on the following fundamentals:

a) The linear optimization problem to be solved for the thruster control can be written down as follows: Needed is the control vector $k_{opt}$, which contains all control values for all thrusters and must meet the following requirements:

1. The required forces and moments $b_{com}$ must be exerted on the spacecraft with the aid of $k_{opt}$. It means that the equation $A_{sys} \cdot k_{opt} = b_{com}$ must be met, wherein $A_{sys}$ is the system matrix in which the three force components and the three moment components for each individual thruster are recorded in one column of this matrix. The system matrix has 6 lines owing to the six possible degrees of freedom for the spacecraft movement, namely 3 forces in three axes that are orthogonal to each other and, correspondingly, 3 moments around these axes and D columns for D thrusters.

2. $k_{opt} = [k_{opt1} \ldots k_{optj} \ldots k_{optD}]^T$ must contain only non-negative values, meaning: $k_{optj} \geq 0; j=1$ (1) D.

3. The sum of all control values must equal a minimum (target function), meaning:

$$\sum_{j=1}^{D} k_{optj} = \text{minimum!}$$

b) A simplex table consists of a column vector for the base variable indices $\lambda_b$, a line vector for the non-base variable indices $\lambda_{nb}$, the coefficient matrix $A_{tab}$, the line vector for the target function coefficients $p_{tab}$, which have been converted to the non-base variables, and the column vector for the base variable values $b_{tab}$:

$$\begin{bmatrix} & \lambda_{nb.n+1} & \cdots & \lambda_{nb.n+j} & \cdots & \lambda_{nb.n+m} & \\ \lambda_{b.1} & a_{11} & \cdots & a_{1j} & \cdots & a_{1m} & b_{\lambda_{b.1}} \\ \vdots & \vdots & & \vdots & & \vdots & \vdots \\ \lambda_{b.k} & a_{k1} & \cdots & a_{kj} & \cdots & a_{km} & b_{\lambda_{b.k}} \\ \vdots & \vdots & & \vdots & & \vdots & \vdots \\ \lambda_{b.n} & a_{n1} & \cdots & a_{nj} & \cdots & a_{nm} & b_{\lambda_{b.n}} \\ & p_{\lambda_{nb.n+1}} & \cdots & p_{\lambda_{nb.n+j}} & \cdots & p_{\lambda_{nb.n+m}} & -Q_0 \end{bmatrix}$$

With the method according to the invention, the simplex table is not used in the full form shown herein.

c) In order to convert an optional 6-dimensional forces-moments vector, a maximum of 6 thrusters of an existing, fixed thruster arrangement are required or the commanded forces-moments vector cannot be realized with the existing thruster arrangement.

d) For each thruster selection I of 6 of D thrusters, a base-variable indices vector $\lambda_b$ (I) exists. The numbers or indices (1, 2, . . . , D) of the thrusters contained in the selection I are combined in the base-variable indices vector $\lambda_b$ (I), and the control values for these thrusters represent the base variable values of the simplex table. The base variable values are stored in the base variable value vector $b_{tab}(\lambda_b, b_{com})$, in accordance with the sequence of the thruster indices in $\lambda_b$(I). A base matrix $B_b$(I) is coordinated with each base variable indices vector $\lambda_b$(I). The base matrix is formed through a column-by-column combining of those columns of the system matrix $A_{sys}$, which belong to the selected thrusters, so that they form a new matrix. The sequence of the columns in the base matrix corresponds to the sequence of the indices for the thrusters in the associated base variable indices vector $\lambda_b$(I). The non-base matrix $B_{nb}$(I) is compiled from those columns of the system matrix, which belong to the thrusters not selected in the selection I. The indices of these thrusters are compiled in the non-base variable indices vector $\lambda_{nb}$(I) The sequence of columns in the non-base matrix corresponds to the sequence of the indices for the thrusters in the associated non-base variable indices vector. The control values for these thrusters equal zero. If the optimum table $\lambda_{b,opt}$, $\lambda_{nb,opt}$, $A_{tab,opt}$, $p_{tab,opt}$ and $b_{tab,opt}$ for a commanded forces-moments vector $b_{com}$ is found, then the control values for the thrusters addressed through the indices $\lambda_{nb,opt}$ equal zero, and the thrusters corresponding to the base variables, meaning those addressed by the indices $\lambda_{b,opt}$, contain as control value the value from the corresponding line of the optimum base variable value vector $b_{tab,opt}$. The base variable indices vector $\lambda_{b,opt}$ provides the optimum thruster selection.

f) For the case where all three force components and all three moment components are exerted simultaneously, the use of maximum 6 of the existing thrusters is necessary. This results exactly in $$A(C_6^D) = \frac{D!}{6!(D-6)!}$$

options (combinations that are not repeated), for selecting 6 of D thrusters. If the indices in the two vectors for the base variable indices and the non-base variable indices $\lambda_b$ and $\lambda_{nb}$ are always sorted in ascending order, then it results respectively in exactly $A(C_6^D)$ of these vectors. For a fixed thruster arrangement, there are only a specific number of thruster combinations, which can represent the thruster selection for a solution of the linear optimization problem. This number generally is considerably smaller than the number $A(C_6^D)$.

One essential foundation of the method is that it always operates with sorted base variable indices vectors and non-base variable indices vectors. Furthermore, the indices or numbers for the thrusters in the base variable indices vectors and the non-base variable indices vectors, for example, are always sorted according to size. In this way, it is possible that exactly one indices vector, exactly one coefficient matrix $A_{tab}=[a_{tab\ kj}]$, exactly one coefficient vector of the target function $p_{tab}$ that is converted to the non-base variables and exactly one base matrix $B_b$ and non-base matrix $B_{nb}$ is assigned to one thruster selection.

Another essential foundation of the method is that a reduced simplex table is used. The reduced table only consists of the thruster selection identification number I and the base variable value vector $b_{tab}$. In addition to providing the coefficient matrix field for all optimum tables and the pivot column indices matrix, it is also necessary to provide the thruster selection identification number matrix, the line substitution indices matrix and the base indices matrix for the method and operation with the reduced table.

The method consists of two parts. The first part, meaning the initialization part, on the one hand functions to provide the field for the coefficient matrixes of all optimum tables $$E = \lfloor \lfloor a_{tabkj} \rfloor_I \rfloor = \lfloor \int_{kjl} \rfloor, \text{ wherein } \lfloor a_{tabkj} \rfloor_I = A_{tab}(I) = B_b^{-1}(I) \cdot B_{nb}(I).$$

The thruster selection identification number runs from 1 to M (I=1(1)M), wherein M stands for the number of all thruster selection options, which represent the optimum selection for an optional forces-moments vector $b_{com}$ and the present optional and unchangeable thruster arrangement. A coefficient matrix for an optimum table within the meaning of this method exists if all elements in the vector belonging to the target function coefficients matrix of the target function coefficients $p_{tab}=p_{tab}(A_{tab})$ that have been converted to the non-base variables not negative. Thus, the following applies for the coefficients matrix elements:

$$1 - \sum_{k=1}^{6} a_{tabkj} = p_{tabj} \geq 0 \text{ for } j = 1(1)6.$$

On the other hand, the following address matrixes are provided in the initialization part of the method: the pivot column indices matrix $p=[P_{Ik}]$, the thruster selection identification number matrix $U=[u_{Ik}]$, the line substitution indices matrix $T=[t_{Ik}]$ and the base indices matrix $L=[1_{Ik}]$. This is done so that a particularly fast access to the data required for the second part of the method is possible and to permit the operation with the reduced table when carrying out the base substitution steps. As a result of the thruster selection identification number I=1, 2, . . . , M, an optimum identification number is assigned to each thruster selection, which can be an optimum selection, and thus also to each coefficients matrix of an optimum table.

In the pivot column indices matrix $P=[p_{Ik}]$, the index of the associated pivot column s $\in$ {0, 1, 2, 3, . . . , (D−6)} is stored for each line of each coefficient matrix that is stored in F. For a coefficient matrix $A_{tab}$ and a selected pivot line z, the pivot column s is that column for which the following applies:

$$\text{minimum } a_{zj} < 0 \frac{p_j}{|a_{zj}|} = \frac{p_s}{|a_{zs}|}, \text{ with } j = 1(1)(D - 6).$$

It means that the pivot column belonging to a line of a coefficient matrix is the column in which the matrix element of the coefficient matrix is negative in this line and where the quotient of the vector element for the target function coefficients in the column, which have been converted to the non-base variables, and the value for the corresponding matrix element in the coefficient matrix is smallest.

With the aid of the pivot column indices matrix, it is possible to specify the corresponding pivot column with $s(A_{tab}(I), z)=p_{Iz}$ from the pivot column indices matrix for a thruster selection I, for which in F the associated coefficient matrix $A_{tab}$(I) was clearly stored, as well as the selected pivot line z. The coefficient matrix $A_{tab}$ (I) or the vector for the target function coefficients $p_{tab}$(I) that have been converted to the non-base variables are not required for this.

If there is no pivot column for a specific line, this is indicated in the pivot column indices matrix by a zero ($p_{Iz}=0$).

In the thruster selection identification number matrix U=[u$_{Ik}$], the thruster selection identification number of that thruster selection is provided for each thruster selection identification number I=1, 2, ..., M and each line z=1, 2, ..., 6 of each coefficient matrix stored in F, which is present following the basic substitution step if the thruster selection I existed prior to the basic substitution step and if the line z was selected as pivot line for the base substitution step. That is to say, if the thruster selection I[n] has been made at a point in time n and a base substitution step with a pivot line z[n] is carried out, then the identification number for the newly created thruster selection can be read directly out of the thruster selection identification number matrix, without the use of A$_{tab}$(I) with I[n+1]=u$_{I[n],z[n]}$. This is made possible in that the pivot column is implicitly fixed as a result of knowledge of the current table (or its identification number I) and the selection of the pivot line. Thus, the explicit knowledge of the pivot column s[n] is not needed to determine the following indicator board.

In the line substitution indices matrix T=[t$_{Ik}$], the line index of the pivot element in the (sorted) reduced table is provided for each line z=1, 2, ..., 6 of each of the coefficient matrixes stored in F. This table exists following the base substitution step, provided the thruster selection I existed prior to the base substitution step and the line z was selected as pivot line.

In the base indices matrix L=[1$_I$], the indices vector for the thrusters in thruster selection I, meaning the base variable indices vector $\lambda_b$(I)=1$_I$ belonging to I, is provided for each thruster selection identification number. The thruster indices in the vectors 1$_I$ are sorted based on size.

Furthermore, a start thruster selection identification number I[0]=I$_{start}$ and the associated inverted base matrix B$^{-1}$$_{b.start}$=(B$_b$(I$_{start}$))$^{-1}$ is provided by the initialization part of the method. For numerical reasons, all values in F and B$^{-1}$$_{b.start}$ with an extremely small value $\epsilon$ (e.g., $\epsilon \approx 10^{-6}$) are set equal to zero.

In the second part of the method, the optimum thruster control, meaning the control values for the thrusters to be activated, is determined to realize the forces and moments commanded in the forces-moments vector. Only this part of the method must meet the expected real-time requirements. This second part again consists of two parts that must be realized successively. Initially, a dual permissible, reduced table is determined as start table. The required number of base substitution steps is realized in the second part.

A dual permissible, reduced start table is determined as follows: in order to provide a dual permissible, reduced table, it is only necessary to transform the current forces-moments vector b$_{com}$ to the thruster selection I[0]=I$_{start}$, which has been determined for the start of the base substitution steps. The previously provided, inverted base matrix B$^{-1}$$_{b.start}$ is used for this and the following applies: b$_{tab.start}$= B$^{-1}$$_{b.start}$·b$_{com}$.

A reduced and dual permissible start table [I[0] b$_{tab}$ [0]] is available with the previously provided thruster selection identification number for the start I[0]=I$_{start}$ and the newly computed vector b$_{tab}$ [0]=b$_{tab.start}$.

This is followed by the realization of the base substitution steps (cyclical part of the method):

The part of the method that is described in the following must be repeated until the optimum thruster selection with the optimum control values has been found or until it is determined that no solution exists for the currently available forces-moments vector and the present thruster arrangement.

Since we proceed from a dual permissible simplex table in the form of the reduced start table and since only one thruster selection with dual permissible simplex table can be generated each time through the base substitution steps, it is possible during the realization of the base substitution steps to revert back time and again to data provided during the initialization part of the method, particularly in the coefficient matrixes field of all optimum and thus simultaneously all dual permissible simplex tables, as well as in the pivot column indices matrix.

First Step

Finding a negative value in b$_{tab}$[n]. The n in square brackets refers to the number of the iteration step. If b$_{tab}$[n] does not contain a negative value, the solution of the linear optimization problem is at hand and the vector for the thruster control values k$_{opt}$ can be built up. If b$_{tab}$[n] contains negative values, then one of these lines is selected as pivot line z[n]. It makes sense to select the line with the highest value in b$_{tab}$[n] for the negative element as pivot line.

Second Step

Given knowledge of the thruster selection identification number I[n] and the pivot line z[n] selected in the first step, the associated pivot column index with s[n]=p$_{I[n],z[n]}$ is read out of the pivot column indices matrix P. If no pivot column index (p$_{I[n],z[n]}$=0) is provided in P, then another pivot line must be selected. If no pivot column is indicated for any of the possible pivot lines in the pivot column indices matrix, then a solution for the linear optimization does not exist. If the pivot line and the pivot column have been determined, the third step is taken.

In the third and fourth step, the actual base substitution step is realized by determining the following reduced simplex table:

Third Step

With the aid of the coefficients in the pivot column s[n] of A$_{tab}$[n], the new base variable value vector b$_{tab.new}$ is computed from b$_{tab}$[n]. The required elements of the pivot column vector a from A$_{tab}$[n] can be read out directly from the field of coefficient matrixes of all optimum tabless with a$_{tab\ k\ s[n]}$[n]=f$_{k\ s[n]I[n]}$.

The elements of the new base variable value vector are computed as follows:

The new value in the pivot line z[n] is computed based on:

$$b_{tabnew\ z[n]} = \frac{b_{tabz[n]}[n]}{f_{z[n]s[n]I[n]}},$$

wherein f$_{z[n]\ s[n]\ I[n]}$ is the correspondingly indexed pivot element from A$_{tab}$[n].

The new values in the other lines are computed based on:

$$b_{tabnew\ k}=b_{tab\ k}[n]-b_{tabnew\ z[n]}f_{ks[n]I[n]}$$

wherein:

(k=1(1)6) but (k≠z[n]).

Since the newly computed base variable value vector b$_{tab.new}$ must tie in with the fictionally assumed, newly sorted base variable indices vector $\lambda_b$[n+1], the newly computed base variable value vector generally must be rearranged accordingly. For this, only the values between the actual pivot line z[n] and the substitution line z$_{sub}$[n]=t$_{I[n]\ z[n]}$, which is read out of the line substitution indices matrix T=[t$_{Iz}$] with the aid of I[n] and z[n], must be substituted cyclically in the newly computed base variable value vector b$_{tab.new}$. The substitution line Z$_{sub}$[n] is that line in which the value for the newly computed base variable value vector is placed, which is located in b$_{tab.new}$ in the pivot line z[n].

Following this rearrangement of the newly computed base variable value vector, the base variable value vector $b_{tab}[n+1]$ that is needed for the following base substitution step is available.

Fourth Step

Once $I[n]$ and the pivot line $z[n]$ are known, $I[n+1]=u_{I[n]\ z[n]}$ is used to determine the thruster selection identification number, which belongs to the newly computed base variable value vector $b_{tab}[n+1]$, which is sorted according to ascending base variable indices. The base substitution step is thus completed, the newly reduced table $[I[n+1]\ b_{tab}[n+1]]$ exists and the solution of the linear optimization problem can continue with the first step of the cyclical part of the method.

If the method stops with a base variable value vector that no longer contains negative values, then the optimum 6-dimensional base variable value vector $b_{tab,opt}=b_{tab}[n_{end}]$ is obtained. With the aid of $I[n_{end}]$, the base variable indices vector belonging to the current base variable value vector subsequently can be read out of the base indices matrix L with $\lambda_b[n_{end}]=1_{I[n_{end}]}$. Given knowledge of the two vectors $b_{tab}[n_{end}]$ and $\lambda_b[n_{end}]$, the optimum D-dimensional control vector for the thrusters $k_{opt}$ is created.

In general, a varying number of base substitution steps $n_{end} \in \{0, 1, \ldots, n_{max}\}$ are also required for solving the linear optimization problem for different forces-moments vectors. With simulation computations for a thruster arrangement with 12 thrusters, up to $n_{max}=10$ base substitution steps were carried out in rare cases, even though on the average only approximately 3.5 base substitution steps were necessary. With a suitable selection of the start table $[I_{start}\ b_{tab.start}]$, however, more than 5 substitution steps are needed only in about 0.5% of all cases. There are generally no noticeable consequences if the maximum number of substitution steps to be realized is limited to a value, at which nearly all cases are processed completely, and these values are set equal to zero for those cases where the base variable value vector still contains negative values. In that way, the worst-case computational effort can be reduced even further. The use of this processing option for the simulation in closed control circuits did not show a noticeable worsening of the control quality or an increase in the fuel consumption.

If the base variable value vector still contains negative values, following the execution of the maximum permissible number of base substitution steps, it is possible in principle that no solution for the linear optimization problem exists. This case can occur with a thruster arrangement, which cannot generate optional forces and moments from the range of all permissible forces-moments vectors. In order to prevent the generating of excessively large faulty forces and faulty moments in those cases, a decision can be made based on the number of negative elements in the base variable value vector on whether to set these negative elements equal to zero and format the control vector for the thrusters or whether there will be no thruster control in general.

If degenerated optimum tables occur during the processing of the simplex algorithm, it is theoretically possible that the algorithm enters into an endless cycle and does not converge. However, this case has never occurred so far in simulation computations with varied thruster arrangements and is therefore not explicitly taken into account. For the dual simplex algorithm, the selected thruster arrangement can ensure that no dual degenerated optimum tables exist. This is not possible in the same way with the primary simplex algorithm, meaning the occurrence of primal degenerated optimum tables.

If the differing specific fuel consumption $C_j$, $j=1(1)D$ of the individual thrusters must be considered during the determination of the minimum-fuel thruster control, then the following target function exists:

$$\sum_{j=1}^{D} k_{opt\ j} = \text{minimum!}$$

The weight coefficients can be considered without any additional effort during that part of the processing that must be realized on-line.

If a thruster fails, the thruster arrangement as defined for this method is changed. In order to use the method for the new thruster arrangement, it is necessary to make all data, provided during the initialization part of the method, available to the new thruster arrangement.

Since the new thruster arrangement differs from the old thruster arrangement only in that it lacks one thruster, there are options for determining the new data by updating the old data. By providing an expanded field of coefficient matrixes, which also stores those coefficient matrixes that become coefficient matrixes of optimum tables as a result of thruster failure, and by providing correspondingly expanded address matrixes, the updating effort can be reduced strongly and can be omitted completely for specific matrixes.

Finally, the option exists of providing ahead of time the data for all thruster arrangements, which can be expected following the failure of a thruster, and to switch to the corresponding, new data if a specific thruster fails. By the time another thruster fails, the data for thruster arrangements to be expected in that case must again be made available, so that it is possible to react to the next thruster failure by switching.

A displacement in the center of gravity of the spacecraft also results in a change in the thruster arrangement as defined in this method. In general, this leads to a change in the system matrix. For that reason, all data derived from this matrix must be made available anew.

The previously described method can also be modified further to save computational expenditure and storage space. For the above description, the control of all 6 degrees of freedom for the spacecraft was always assumed as starting point. However, the method can also be used for controlling 1 to 5 degrees of freedom. It is only necessary to delete or neglect the lines in the system matrix that correspond to the non-controlled degrees of freedom and the vectors and matrixes derived thereof. In the same way, it is possible to control a constantly changing partial number of all 6 degrees of freedom. However, with an oblique-angle thruster arrangement, the degrees of freedom that are not controlled generally are influenced.

If non-optional forces and moments must be exerted on the spacecraft, it is possible to use a reduced thruster arrangement. The method at hand can be used for such arrangements as well. The only thing that should be ensured is that the commanded forces and moments of the command can be realized with the present thruster arrangement. If the command cannot be realized, the method will indicate that a solution for the linear optimization problem does not exist.

In dependence on the present thruster arrangement, it can happen that specific columns of the coefficient matrixes stored in the coefficient matrixes field of all optimum tables are never selected as pivot columns. Following computation of the pivot column indices matrix P, it is easy to determine the non-required columns for all coefficient matrixes. It is possible to set up a field of all relevant pivot column vectors V, in which only the columns of the coefficient matrixes for all optimum tables are stored, which are actually needed as pivot columns. A significant savings in storage space can be achieved as a result. The addressing of the matrix columns in the field for all relevant pivot column vectors does not require an increased computation expenditure. In the field of all relevant pivot column vectors, each column has its column index. If in a changed pivot column indices matrix of the pivot column identification number matrix $O=[o_{Ik}]$, the column index of a pivot column vector in a coefficient matrix is not indicated and, instead, the pivot column identification number is directly indicated as column index r in the field for all relevant pivot column vectors V, then it is possible to provide the column index in the field of all relevant pivot column vectors $V=[v_{kr}]$ directly during the second step of the cyclical part of the method with $r=o_{Ik}$. The determination of the elements for the new base variable value vector in the third step of the cyclical method part then changes as follows:

$$b_{tabnew\,z[n]} = \frac{b_{tabz[n]}\,[n]}{v_{z[n]r[n]}},$$

wherein $V_{z[n]\,r[n]}$ is the correspondingly indexed pivot element from $A_{tab}[n]$. The new values for the other lines are computed as follows:

$$b_{tab\,new\,k} = b_{tab\,k}[n] - b_{tab\,new\,z[n]} \cdot V_{k\,r[n]}$$

wherein:

(k=1(1)6) but (k≠z[n]).

The other parts of the method remain unchanged.

If a field for all relevant pivot column vectors V exists, it can be determined that relevant pivot column vectors for different optimum tables are numerically identical, particularly with thruster arrangements having specific symmetries. Since the multiple storage of identical pivot column vectors is not necessary, storage space can again be saved. During the successive formatting of the field of all relevant pivot column vectors in the initialization part of the method, it is possible to check whether a numerically identical pivot column vector to the just determined pivot column vector has already been stored in V. If this is the case, a renewed storage of this relevant pivot column vector is not necessary. The pivot column identification number (column index) of the pivot column vector previously stored in the field for all relevant pivot column vectors is then entered into the pivot column identification number matrix 0, which is associated with V.

If it is necessary to further reduce the required memory for the method, a method variant can be used, which does not require all relevant pivot column vectors to be stored in the computer memory, but only representative vectors. Representative vectors are relevant pivot column vectors from which additional relevant pivot column vectors can be computed with only a minimum of computational effort.

Each pivot column vector $a=[a_1\,a_2\,\ldots\,a_i\,\ldots\,a_n]^T$ belongs to a specific base, e.g. $\lambda_b(I_1)=[\lambda_{k.1}\lambda_{1.2}\ldots\lambda_{s.1}\ldots\lambda_{p.n}]^T$ and to a non-base variable, e.g. $\lambda_{nb}=\lambda_r$. If $a_i$ differs from zero, it is possible to use $a(I_1,\lambda_r)=[a_1\,a_2\,\ldots\,a_i\,\ldots\,a_n]^T$ for computing the pivot column vector $a_{new}=a(I_2,\lambda_s)=[a_{new.1}\,a_{new.2}\,\ldots\,a_{new.i}\,\ldots\,a_{new.n}]^T$ with $$a_{new.i} = \frac{1}{a_i}$$

and $a_{new.k}(k \neq i) = -a_k \cdot a_{new.i}$, which belongs to the base $\lambda_b(I_2) = [\lambda_{k.1}\,\lambda_{1.2}\,\ldots\,\lambda_{r.i}\,\ldots\,\lambda_{p.n}]^T$ and to the non-base variable $\lambda_{nb}=\lambda_s$. Thus, the new pivot column vector $a(I_2, \lambda_s)$ can be computed from $a(I_1, \lambda_r)$ by indicating the substitution index i.

In this way, up to six additional pivot column vectors can be computed, for example, from a six-dimensional pivot column vector. For use with the method for a minimum-fuel thruster control, it is now possible to limit oneself to storing those relevant pivot column vectors as representative vectors, which are necessary to compute all relevant pivot column vectors as indicated.

Genetic algorithms can be used favorably as optimization method to determine the smallest possible number of representative vectors.

For a suitable addressing of the representative vectors in the matrix for all representatives, it is necessary to have on the one hand a representative identification number matrix R and on the other hand also a substitution indices matrix S in place of the pivot column indices or the pivot column identification number matrix. The representative identification number matrix R contains the identification number of that representative vector for each thruster selection identification number and each pivot line, which can be used to compute the actually required pivot column vector. In the substitution indices matrix S, the line index of the substitution element is indicated for each thruster selection identification number and each pivot line, so that the actually needed pivot column vector can be computed from the representative vector. A zero at one location in the substitution index matrix means that the addressed representative vector directly represents the pivot column vector and the conversion to the currently needed pivot column vector is unnecessary.

Owing to the fact that pivot column vectors sorted according to base variable indices are always used, the pivot column vector that is initially computed from the representative vector must still be resorted (e.g. based on ascending base variable indices) before it can be used. If the base variables are sorted according to magnitude, exactly 30 options for resorting exist with a six-element vector, in order to reestablish the required order. If a resorting is necessary, one vector element is always taken from one position in the vector and is recorded to another position. The vector elements between the two positions are correspondingly displaced.

A sorting identification number matrix $G=[g_{Ik}]$ contains the sorting identification number for each representative and each substitution line, based on which the vector must be resorted to obtain the necessary pivot column vector.

Up to 7×31=217 vectors can be formed from a representative vector through base substitution and/or the above-described resorting. If all these options are taken into account, it is possible that fewer representative vectors are needed, owing to symmetries in the thruster arrangement, than would be required if only the seven relevant pivot column vectors, formed from a representative vector, were taken into account.

Another variant of the method is obtained by omitting the base substitution at the representative vector and by taking into account only the 30 resorting options of the representative vector. A representative vector in this way represents 31 vectors. As a result of symmetries in the thruster arrangement, it is also possible to generate several relevant pivot column vectors in this way. However, in comparison to the previous method variant, more representative vectors are generally needed. At the same time though, the computation expenditure for the base substitution at the representative vector becomes unnecessary and the substitution indices matrix S is not necessary.

What is claimed is:

1. A method for the on the whole minimum-fuel, computer-assisted control of an optionally determined number of thrusters, arranged as desired on a spacecraft, wherein a minimum-fuel control vector ($k_{opt}$) with exclusively non-negative control values for all specified thrusters is formed with the aid of the dual simplex algorithm;

for this, a thruster selection identification number (I) is assigned to each thruster selection from the total number of thrusters on the spacecraft, which represents the optimum thruster selection for the minimum-fuel realization of an optional command vector ($b_{com}$);

for the determination of the optimum control, the command vector (($b_{com}$), which includes the force and/or moment components to be exerted, is initially transformed to a start vector ($b=b_{start}$) through multiplication with a transformation matrix (($B_{start})^{-1}$);

subsequently the dual simplex algorithm is executed until the vector for the control values (b) contains only non-negative control values or until the non-existence of a solution has been indicated;

in the process, the dual simplex algorithm is realized in that all data necessary for processing the dual simplex algorithm, which can be computed off-line (ahead of time), are first determined, are stored in data fields in the computer memory and are called up with suitable addresses from the computer memory to be used for computing with the simplex algorithm during the on-line operation, wherein only a reduced simplex table is used, in which only the thruster selection identification number and the associated vector for the control values (b) are listed.

2. A method according to claim 1, wherein the transformation matrix (($B_{start})^{-1}$) represents the inverted base matrix for the thrusters belong to the start thruster selection, that this thruster selection is an optimum selection for an optional command vector, this thruster selection is assigned a start thruster selection identification number ($I_{start}$), and the start vector ($b=b_{start}$) includes the control values for these thrusters.

3. A method according to claim 1, wherein each thruster on the spacecraft is provided with an identification number and the values in the vector for the control values for a specific thruster selection are always sorted according to a fixed order and with the aid of the identification numbers for the thrusters, when processing the dual simplex algorithm following the determination of a pivot line number and with knowledge of the thruster selection identification number for the actually existing thruster selection, the corresponding pivot column number is read out of a previously provided pivot column indices matrix, the non-existence of a pivot column number for the available thruster selection identification number and the selected pivot line is clearly indicated by a special entry to the pivot column indices matrix, the non-existence of a solution is indicated in that no pivot column number is praovided for any possible pivot line in the pivot line indices matrix.

4. A method according to claim 1, wherein the pivot column vector of the coefficient matrix of the actual simplex table, the values of which are necessary for computing new control values for the thrusters of a new thruster selection, are read out of a previously provided field of all possible optimum coefficient matrixes by having knowledge of the thruster selection prior to the base substitution step and the selected pivot column number, the vector for the control values of the thrusters in the thruster selection, which is available after the base substitution step, is computed and the values in this vector are sorted in accordance with the assignment to the thrusters and corresponding to the fixed order of the identification numbers for the thrusters.

5. A method according to claim 1, wherein if the thruster selection identification number is known prior to the base substitution step and the selected pivot line number is known, the thruster selection identification number for the thruster selection available after the base substitution step is read out of a thruster selection identification number matrix, once a vector of the control values is available, which contains only non-negative values, the vector for the thruster indices is read out of a base variable indices matrix with knowledge of the associated thruster selection identification number, the thrusters indexed with the thruster identification number are provided with the corresponding value from the vector for the control values (b) and the remaining thrusters are provided with the control value zero, and the control vector ($k_{opt}$) is determined in this way.

6. A method according to claim 1, wherein only those columns of coefficient matrixes of dual permissible simplex tables are stored in a matrix of all relevant pivot column vectors, which can actually be selected as pivot column vectors during the processing of the method, and identical, relevant pivot column vectors are stored only once in this matrix.

7. A method according to claim 6, wherein in order to address the relevant pivot column vectors, a pivot column identification number is assigned to each pivot column vector in the matrix for all relevant pivot column vectors, and this identification number is recorded in a pivot column identification number matrix such that with knowledge of the current thruster selection identification number and the currently selected pivot line number, the pivot column identification number for the currently required pivot column vector can be read out, the non-existence of a pivot column for a selected pivot line is clearly indicated by a special entry to the pivot column identification number matrix, the non-existence of a solution is determined if no pivot column identification number is indicated in the pivot column identification number matrix for any possible pivot line.

8. A method according to claim 3, wherein instead of the relevant pivot column vectors, only specific pivot column vectors are stored as representative vectors in the computer memory, wherein the representative vectors represent a smallest possible number of pivot column vectors from which the actually required relevant pivot column vectors are determined, each representative vector is assigned a representative identification number and, in order to address the representative vectors, a representative identification number matrix is used, into which the representative identification number of that representative vector is entered for each thruster selection identification number and each pivot line, which is used to compute the necessary pivot column vector.

9. A method according to claim 8, wherein for each thruster selection identification number and each pivot column number, the line index for the base variable to be substituted is indicated as replacement element in a replacement matrix, so that the necessary pivot column vector can be computed from the representative vector.

10. A method according to claim 1, wherein for a possible change in the thruster arrangement, caused by thruster failures to be expected, the corresponding data are computed and stored ahead of time and, following detection of a thruster failure, the computer automatically shifts to using the corresponding new data.

11. A method according to claim 10, wherein the new data required after a thruster failure are provided through a corresponding correction and updating of the data used up until the thruster failure.

12. A method according to claim 1, wherein the method is used regardless of the dimension of the command vector ($b_{com}$) and that in the process, the components that have no effect are eliminated from the complete system matrix of the thruster arrangement for the computation of the previously provided data.

* * * * *